United States Patent
Chan et al.

(10) Patent No.: US 12,392,718 B2
(45) Date of Patent: Aug. 19, 2025

(54) METHOD AND SYSTEM FOR MATERIAL CLASSIFICATION OF AN OBJECT

(71) Applicant: Logistics and Supply Chain MultiTech R&D Centre Limited, Pok Fu Lam (HK)

(72) Inventors: Kin Sun Chan, Pok Fu Lam (HK); Yan Nei Law, Pok Fu Lam (HK); Ka Lun Fan, Pok Fu Lam (HK)

(73) Assignee: Logistics and Supply Chain MultiTech R & D Centre Limited, Pok Fu Lam (HK)

( * ) Notice: Subject to any disclaimer, the term of this patent is extended or adjusted under 35 U.S.C. 154(b) by 318 days.

(21) Appl. No.: 17/709,679

(22) Filed: Mar. 31, 2022

(65) Prior Publication Data

US 2023/0314317 A1 Oct. 5, 2023

(51) Int. Cl.
*G01N 21/359* (2014.01)

(52) U.S. Cl.
CPC ..... *G01N 21/359* (2013.01); *G01N 2201/126* (2013.01)

(58) Field of Classification Search
CPC ............. G01N 21/359; G01N 21/3563; G01N 2201/126; G01N 2201/1296
USPC .......................................................... 702/28
See application file for complete search history.

(56) References Cited

U.S. PATENT DOCUMENTS

| | | | | |
|---|---|---|---|---|
| 6,014,652 A * | 1/2000 | Hill | ......................... | G01N 29/48 706/15 |
| 6,381,017 B2 * | 4/2002 | Jung | ..................... | G01N 21/251 433/29 |
| 2019/0318469 A1 * | 10/2019 | Wang | ........................ | G06N 3/08 |
| 2021/0223031 A1 * | 7/2021 | Lee | ........................ | G06F 18/256 |

OTHER PUBLICATIONS

Zackory Erickson, Eliot Xing, Bharat Srirangam, Sonia Chernova, and Charles C. Kemp, "Multimodal Material Classification for Robots using Spectroscopy and High Resolution Texture Imaging", Jul. 30, 2020 (Year: 2020).*

Z. Erickson, N. Luskey, S. Chernova, and C. Kemp, "Classification of household materials via spectroscopy," IEEE Robotics and Automation Letters, vol. 4, No. 2, pp. 700-707, 2019.

* cited by examiner

*Primary Examiner* — John H Le
(74) *Attorney, Agent, or Firm* — Renner, Kenner, Greive, Bobak, Taylor & Weber

(57) ABSTRACT

A method for material classification of an object. The method contains the steps of measuring, by a first light sensor, an intensity of a first light signal from an object; measuring, by a second light sensor, an intensity of a second light signal from the object; inputting features related to the intensity of the first light signal and features related to the intensity of the second light signal into a neural network; calculating by the neural network, for each of a plurality of possible classes of material, a probability of the object containing the material of the class; and determining a material of the object based on one of the plurality of possible classes of material that has a highest probability. Embodiments of the invention provide an automatic solution of material classification based on neural network, which achieves a high successful recognition rate of the material.

11 Claims, 2 Drawing Sheets

METHOD AND SYSTEM FOR MATERIAL CLASSIFICATION OF AN OBJECT

FIELD OF INVENTION

This invention relates to a computer-based spectroscopy system, and in particular to a system for material classification of objects.

BACKGROUND OF INVENTION

In modern society, the amount of industrial and household items being recycled for the purpose of environmental protection or reduction of industrial waste is steadily increasing, which helps reduce environmental risks and increase the resilience of societies and the environment. Recycling can be roughly divided into recycling use and reuse. For recycling use, individual parts of an item are sorted by their material type and re-produced as raw materials. In other words, to enable efficient recycling process, the items that are to be recycled need to be classified first according to their materials, or at least their primary materials (e.g., paper, plastic, metal, glass), so that a proper recycling process can be carried out for an item according to its material.

Conventionally, classifying materials of items is not easy, and often requires human inspection to the items, followed by human hand/robotic arm operation to move an item to a corresponding container. There have been some algorithms developed to enable fully automatic material classification, e.g., by using haptic sensing that exerts a pressure on the item to identify the material of the item. However, the pressure-based classification method is not reliable and leads to a high failure rate in recognition.

SUMMARY OF INVENTION

Accordingly, the present invention, in one aspect, is a method for material classification of an object. The method contains the steps of measuring, by a first light sensor, an intensity of a first light signal from an object; measuring, by a second light sensor, an intensity of a second light signal from the object; inputting features related to the intensity of the first light signal and features related to the intensity of the second light signal into a neural network; calculating by the neural network, for each of a plurality of possible classes of material, a probability of the object containing the material of the class; and determining a material of the object based on one of the plurality of possible classes of material that has a highest probability.

In some embodiments, the neural network is a convolutional neural network comprising two consecutive convolution layers.

In some embodiments, the features related to the intensity of the first light signal are differential features of the intensity of the first light signal. The features related to the intensity of the second light signal are differential features of the intensity of the second light signal.

In some embodiments, the step of inputting features further contains calculating differential features of the intensity of the first light signal as a function of the intensity of the first light signal at different wavelengths of the first light signal, and calculating differential features of the intensity of the second light signal as a function of the intensity of the second light signal at different wavelengths of the second light signal.

In some embodiments, for differential features of both the intensity of the first light signal and the intensity of the second light signal, step c) further comprises using the following formula to compute the differential features:

$$d_{In} = (I_{n+1} - I_n)/(w_{n+1} - w_n)$$

wherein n is a sampling index from 0 . . . to N−2, N−1; wherein N is the number of samples taken for the intensity of the first light signal or intensity of the second light signal; $I_n$ is the intensity corresponding to the wavelength $w_n$ at n.

In some embodiments, both the first light sensor and the second light sensor are near-infrared sensors.

In some embodiments, the first light signal includes lights having wavelengths within the range of 900 nm-1700 nm, and the second light signal include lights having wavelengths within the range of 1750 nm-2150 nm.

In another aspect, the invention provides a system for material classification of an object, including: a first light sensor adapted to measure an intensity of a first light signal from an object; a second light sensor adapted to measure an intensity of a second light signal from the object; and a computing device connected to the first light sensor and the second light sensor. The computing device is adapted to implement a neural network. The neural network is configured to receive features related to the intensity of the first light signal and features related to the intensity of the second light signal respectively from the first light sensor and the second light sensor. The neural network is further adapted to calculate, for each of a plurality of possible classes of material, a probability of the object containing the material of the class, and to determine a material of the object based on one of the plurality of possible classes of material that has a highest probability.

In some embodiments, the first light sensor and the second light sensor each includes an integrated light source.

In some embodiments, the neural network is a convolutional neural network that includes two consecutive convolution layers.

In some embodiments, the features related to the intensity of the first light signal are differential features of the intensity of the first light signal. The features related to the intensity of the second light signal are differential features of the intensity of the second light signal.

In some embodiments, both the first light sensor and the second light sensor are near-infrared sensors.

In some embodiments, the first light signal includes lights having wavelengths within the range of 900 nm-1700 nm. The second light signal includes lights having wavelengths within the range of 1750 nm-2150 nm.

In some embodiments, the system further includes a sample stage on which the object is placed. The first light sensor and the second light sensor are embedded in the sample stage under a top surface thereof.

In some embodiments, the first light sensor and the second light sensor are arranged side by side.

Embodiments of the invention therefore provide an automatic solution of material classification based on neural network, which achieves a high successful recognition rate of the material. By deploying two light sensors to detect light signals in different wavelengths that are reflected or transmitted through an object to be recognized, the neural network is able to compute the probability of possible, different material classes based on the different light signals, and picks up a class that provides more confidence. In this way, the chance that the object made from a certain material but being misclassified into another material is minimized.

In embodiments of the invention, the light sensors each outputs only a scalar which is the intensity of a light signal, and this provides a high reliability to the data accuracy while avoiding the need to use complicated and expensive detector modules. With two or more sensors configured in the material classification system, the procedure of measurement ensures that the object can be recognized when the different parts of the object are randomly scanned by the light sensors in the test process, and when the scanning is conducted only once.

In addition, in one implementation of the invention two NIR (Near-InfraRed) sensors used to detect the intensity of light signals are embedded under a tabletop side by side, so such a workbench provides great flexibility to the manipulation of the object to be recognized when the object in fact is placed on a horizontal support plane. Either manual movement of the object, or automatic movement of the object is possible, for example by using conveying belt, robotic arm, etc., in the latter case. Thus, the material classification system according to embodiments of the invention can be easily adopted in many industrial applications and existing hardware.

The foregoing summary is neither intended to define the invention of the application, which is measured by the claims, nor is it intended to be limiting as to the scope of the invention in any way.

BRIEF DESCRIPTION OF FIGURES

The foregoing and further features of the present invention will be apparent from the following description of embodiments which are provided by way of example only in connection with the accompanying figures, of which.

In the drawings, like numerals indicate like parts throughout the several embodiments described herein.

DETAILED DESCRIPTION

Figure 1:
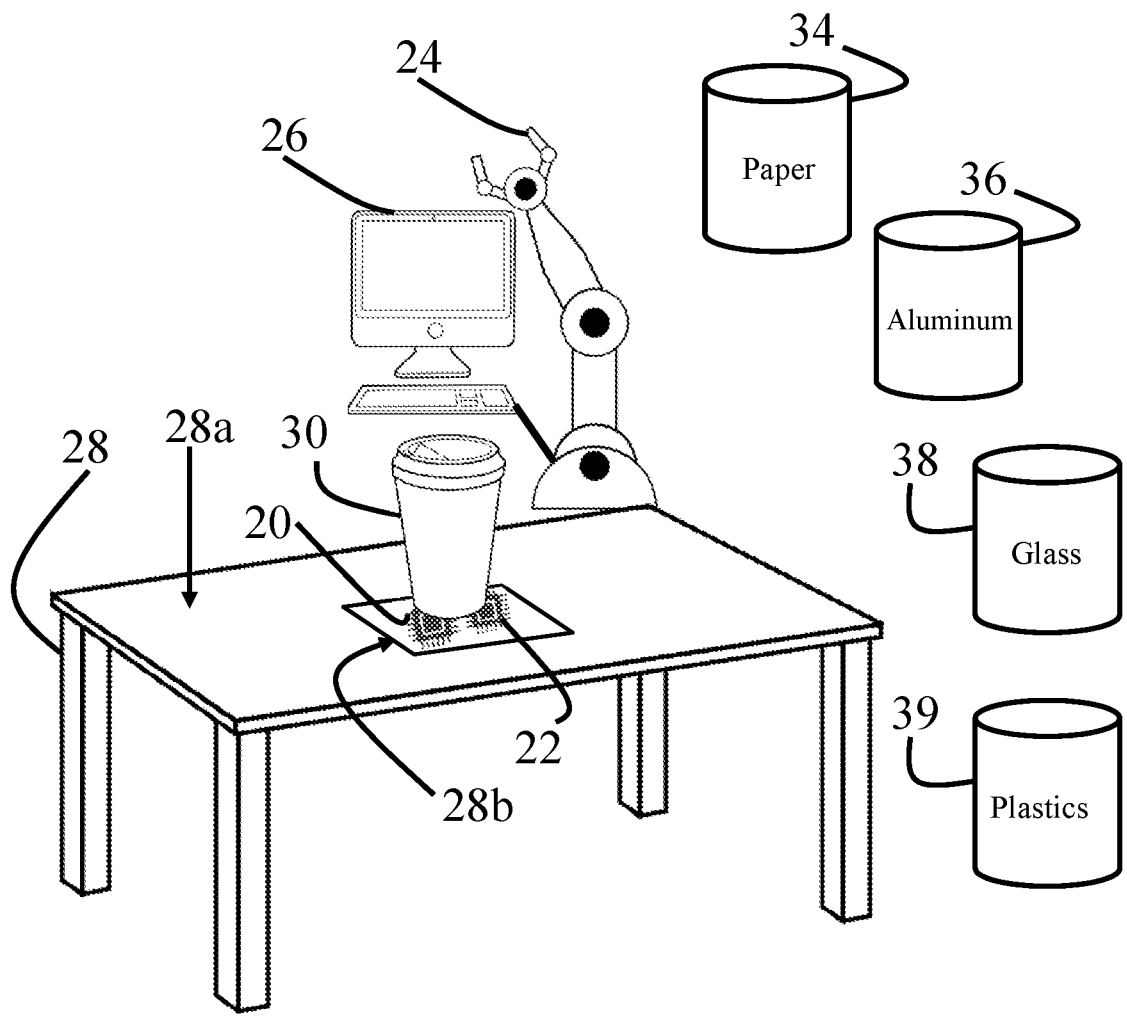
FIG. 1 is an illustration of a material classification system according to an embodiment of the invention.

Referring now to FIG. 1, the first embodiment of the present invention is a system for material classification of random objects. In the example of FIG. 1, the object the material of which is to be identified/recognized is a paper cup 30. The system is implemented as a fully automatic system that requires no manual manipulation. In particular, a support structure is provided by a table 28 in this embodiment that has a tabletop 28a which provides a flat, horizontal top surface. The tabletop 28a therefore provides a sample stage for any sample to be recognized and classified. Underneath the tabletop 28a there are installed two light sensors in a cut-out region 28b of the tabletop 28a, respectively a first NIR sensor 20 and a second NIR sensor 22, which are adapted to emit respectively a first light signal and a second light signal toward an item that is placed on the tabletop 28a above the first NIR sensor 20 and the second NIR sensor 22. The first NIR sensor 20 and the second NIR sensor 22 are positioned side-by-side. As skilled persons will understand, in the cut-out region 28b there may be configured a transparent cover (not shown) on top of the first NIR sensor 20 and the second NIR sensor 22 to protect the two light sensors from external impact, liquid, etc., from damaging the two light sensors. The transparent cover is flush with the rest part of the tabletop 28a.

Adjacent to the table 28 a robotic arm 24 is configured which is connected to a control console 26 for the robotic arm 24. The control console 26 is a computing device and is adapted to run a neural network as an important part of the material classification system. The neural network will be described in more details later. The control console 26 also allows a user to either locally or remotely inspect the classification process, e.g., to see charts and statistics regarding how many items have been processed, a successful recognition rate, numbers of items classified to each of a plurality of material classes (e.g., paper, aluminum, glass), etc. The robotic arm 24 functions to pick up an unclassified object from a reservoir (not shown) and place it on the tabletop 28a, and also to move the object after it has been recognized to an appropriate container for a certain material. In the example shown in FIG. 1, there are four such material containers set, which are a paper material container 34, an aluminum material container 36, a plastics material container 39, and a glass material container 38.

The first NIR sensor 20 and the second NIR sensor 22 are configured to work under different wavelengths, and in particular the first NIR sensor 20 is configured to work under a range of 900 nm-1700 nm, while the second NIR sensor 22 is configured to work under a range of 1750 nm-2150 nm. Both the first NIR sensor 20 and the second NIR sensor 22 can be obtained commercially from the market, for example the first NIR sensor 20 could be NIRONE® Sensor S from Spectral Engines GmbH©, and the second NIR sensor 22 could be DLP® NIRscan™ Nano EVM from Texas Instructions©. In both the first NIR sensor 20 and the second NIR sensor 22, there is at least one integrated light source, a NIR sensor, read-out and driving electronics, and other electronic components. In measuring the light intensities, a voltage is outputted by an InGaAs (Indium gallium arsenide) photodiode with transimpedance amplifier in each of the first NIR sensor 20 and the second NIR sensor 22.

Figure 2:
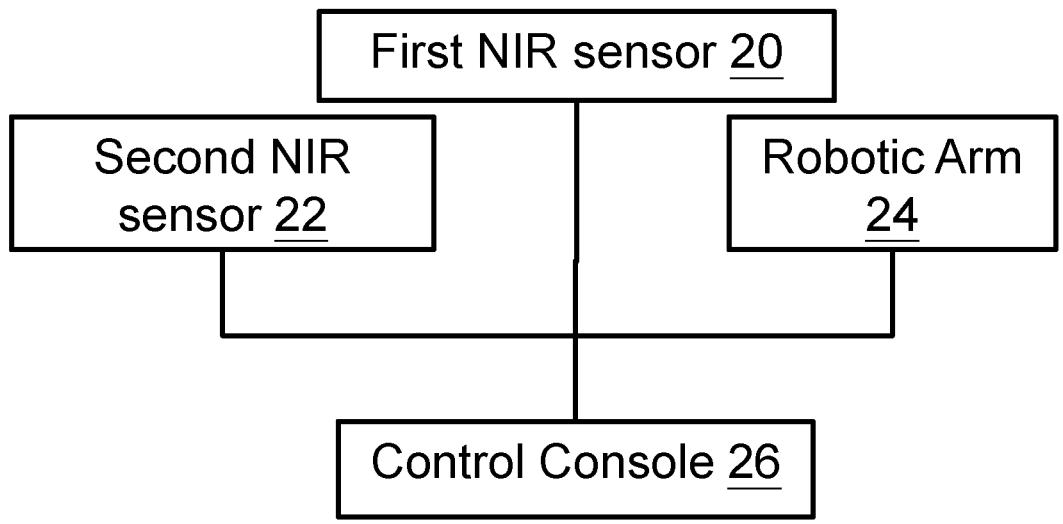
FIG. 2 shows the schematic diagram of the system of FIG. 1.

As shown in FIG. 2, the control console 26 is communicationally connected to all of the first NIR sensor 20, the second NIR sensor 22, and the robotic arm 24. The outputs (sensed light signals) from the first NIR sensor 20 and the second NIR sensor 22 thus are provided to the control console 26 for the neural network work to operate. The control console 26 also controls the action of the robotic arm 24 to carry out various manipulations of the item as mentioned above.

Figure 3:
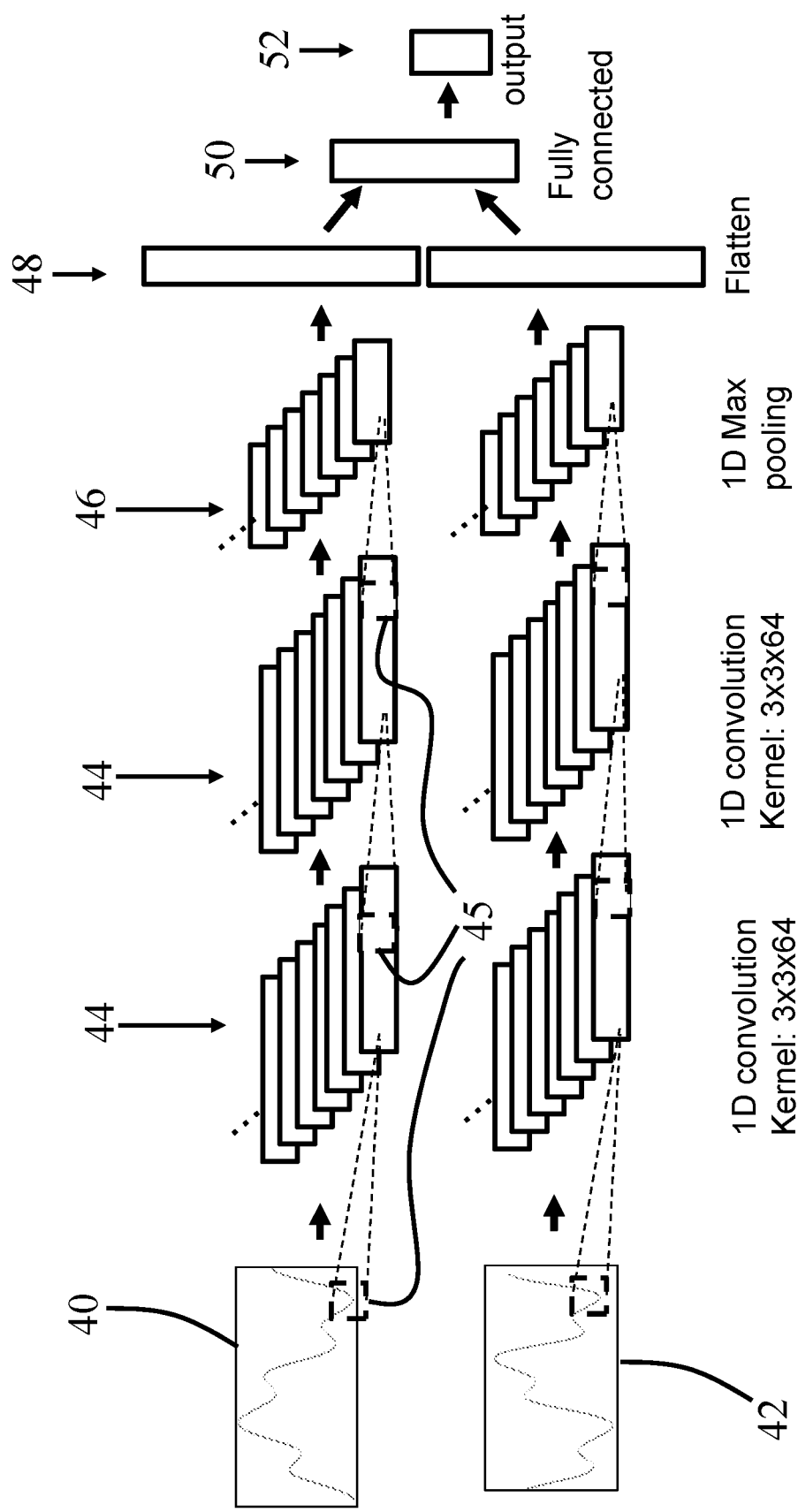
FIG. 3 illustrates the workflow of the convolutional neural network in the system of FIG. 1.

Having introduced the components and structure of the material classification system in FIG. 1, the operation of the material classification system and in particular the working principle of the neural network will now be described. FIG. 3 best illustrates the working flow of the neural network, which in this embodiment is a convolutional neural network. Firstly, it should be noted that in this embodiment, the outputs of the first NIR sensor 20 and the second NIR sensor 22 are not related to any geometric features (e.g., incident angle, travel distance, etc.) of the light signals emitted by the first NIR sensor 20 and the second NIR sensor 22 onto the item to be recognized and then reflected back to the first NIR sensor 20 and the second NIR sensor 22. Instead, only the light intensities of the light signals received by the first NIR sensor 20 and the second NIR sensor 22 are concerned. In particular, two distributions of intensity features $F(n)$, are derived as functions of the raw light intensities captured from the first NIR sensor 20 and the second NIR sensor 22. The intensity features $F(n)$ are differential features of the raw light intensities of the first light signal or the second light signal captured respectively by the two light sensors, and the differential features are a function of the raw light intensities at different wavelengths. In this way, the raw light intensities (in the form of voltage values) are standardized and extracted.

For example, for the first light signal, the differential features are light intensities at different wavelengths within the wavelength range of 900 nm-1700 nm that is captured by the NIR sensor 20. The differential features of both the first light signal and the second light signal are computed using the following formula:

$$d_{In} = (I_{n+1} - I_n)/(w_{n+1} - w_n)$$

wherein n is a sampling index from 0 . . . to N-2, N-1; wherein N is the number of samples of light signals taken for the intensity of the first light signal or intensity of the second light signal; $I_n$ is the intensity corresponding to the wavelength $w_n$ at the sampling index n. The differential features ($d_{I0}$, $d_{I1}$, . . . $d_{IN-2}$, $d_{IN-1}$) are then inputted to the neural network. It should be noted that in this calculation, it is defined that $d_{IN-1} = d_{IN-2}$.

In one specific example, the number of sampling n is from 0 to 100 for the first NIR sensor 20 ($w_0$=1750 nm, $w_1$=1754 nm, . . . , $w_{100}$=2150 nm) and n is from 0 to 227 for the second NIR sensor 22 ($w_0$=901.36 nm, $w_1$= 905.27 nm, . . . , $w_{227}$=1700.65 nm). The sampling step between each light intensity value that is captured is about 4 nm.

After the two sets of differential features 40, 42 are generated respectively for the first light signal captured by the first NIR sensor 20, and for the second light signal captured by the second NIR sensor 22, the two sets of differential features 40, 42 are then inputted to the neural network and the probabilities of the classes are estimated. As the output of the neural network, the class with the highest probability is chosen as the estimated material.

FIG. 3 shows that the neural network contains two identical one-dimensional convolution layers 44 in the two branches for the two inputs of the neural network, namely the two sets of differential features 40, 42. The two identical convolution layers 44 in each branch are needed because deep learning process carried out by the neural network requires to have more layers for learning more advanced features. The total number of layers in the neural network in FIG. 3 can be seen to be five (excluding the input layer represented by the wo sets of differential features 40, 42 and the output layer 52). This is because empirically, inventors of the present application found that five layers are sufficient for classifying materials based on NIR sensors. Each of the convolution layers 44 (there are four in total as shown in FIG. 3) has an array size of 3×3×64 in this example, where the numbers here (3, 3, 64) are in the unit of different functions $d_{In}$. As skilled people in the art would understand, the objective of the convolution operation is to extract high-level features the input differential features. Between the two convolution layers 44 in each branch, the first convolution layer 44 is responsible for capturing low-level features such as wavelengths, intensity values, gradients, etc. The second convolution layer 44 in the branch adapts to the high-level features. As such, the convolutional neural network has the wholesome understanding of the reflected light signals from the object to be recognized. The element (shown by the boxes 45 in FIG. 3) involved in carrying out the convolution operation in the convolution layers 44 is called the Kernel/Filter.

After the two convolution layers 44 in each branch, there is a one-dimensional pooling layer 46. As skilled persons will understand, the pooling layer 46 is responsible for reducing the spatial size of the convolved feature. This is to decrease the computational power required to process the data through dimensionality reduction. Furthermore, it is useful for extracting dominant features which are rotational and positional invariant, thus maintaining the process of effectively training of the model. As it is a max pooling layer, the pooling layer 46 returns the maximum value from the portion of the differential features covered by the Kernel (shown by each box 45 in FIG. 3). Max Pooling also performs as a noise suppressant. It discards the noisy activations altogether and also performs de-noising along with dimensionality reduction.

After the pooling layer 46 in each branch, there is a flatten layer 48, which transforms the features from a multi-dimensional array to a one-dimensional vector. In the example mentioned above, after max pooling in each branch there are two 2×1×256 arrays. Then, after the flatten operation is completed, the flattened array becomes a 1×512 vector. Finally, in the combining layer 50 the two flattened vectors are concatenated and are fully connected. The result of the combining step is 1×1024 vector from the two 1×512 vectors. The 1×1024 vector of probabilities is then outputted in the output layer 52 which is further analyzed to find out the class with the highest probability, which is then chosen as the estimated material. By deploying two light sensors to detect reflected light signals in different wavelength regions, and their differential functions be inputted to the neural network in two parallel branches, the neural network achieves significant improvements in the accuracy of recognition and the chance that the object made from a certain material but being misclassified into another material is minimized. The two light sensors may receive light signals reflected from different portions of the object but with the neural network, the discrepancies in the portions of the object that reflected the light signals are catered for and suppressed.

The classification/identification process using the neural network in FIG. 3 has been described. The other aspects of the convolution neural network including its structures, functions, constraints, training, working principles etc., are well-known to skilled persons in the art so they will not be described in other details here. Nonetheless, for the training stage of the neural network of the material classification system, in one example the measurements were performed by 10 times at different locations on an object in the training stage. By collecting the 10 measurements for each object, the user then moves the object manually. This procedure of the measurements ensures the object can be recognized even though the different parts of the object are scanned in the testing stage. In the testing stage, where an object with unknown material is recognized, the object is scanned once only.

In the following section an experiment with a protype of the material classification system described above has been conducted and data are obtained. Three different material classes, i.e., aluminum, paper and plastic are chosen and in the training stages various objects made from either of three materials were used to train the neural network. In particular, 44 objects made from aluminum, 92 objects made from paper, and 153 objects made from plastics were used for the training. Each object has 10 records/samples at different portions thereof. As such, the total number of samples for each class is aluminum: 4400, paper: 9200, plastic: 15300. The evaluation method of the trained neural network was a 5-fold validation (80/20), and two sets of differential features were inputted to and combined in the neural network as shown in FIG. 3. In the end, the experimental results of the material classification system attempting to recognize the material of an unknown object being in one of the three classes, indicate an overall accuracy of 91.60%. Among the items tested, those made from aluminum achieved an accuracy of 79.18%, those made from paper achieved an accuracy of 91.39%, and those made from plastics achieved an accuracy of 95.29%.

The exemplary embodiments are thus fully described. Although the description referred to particular embodiments, it will be clear to one skilled in the art that the invention may be practiced with variation of these specific details. Hence this invention should not be construed as limited to the embodiments set forth herein.

While the embodiments have been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the exemplary embodiments described above, a robotic arm is used to carry the object to be recognized to the sample stage above the light sensors, and also to move the recognized object out from the sample stage to an appropriate container (e.g., recycle bin). However, one should realize that it is also possible for the user to manually move the object(s) in part of the whole process of the material classification. The robotic arm and the human hand can be used at the same time, or more than one robotic arms can be used in the material classification system.

Also, in the embodiments described above two sensors with different wavelengths are used. The invention is however not limited to the use of two sensors, as more sensors can also be used which may further increase the recognition successful rate at the cost of, for example, device costs, size, and complexity. Likewise, the wavelength ranges of 900-1700 nm and 1750-2150 nm mentioned above are not limiting to the invention, as each of the multiple sensors may be configured under a different wavelength range from the above, and also the spectrum may go beyond the NIR range.

For the light sensors mentioned in the embodiments above, the light sensor contains an integrated light source that emits light toward the object and the reflected light signal is then captured by the light sensor. However, in other embodiments the light signal may also be a transmissive one, e.g., a light source separated from the light sensor placed at another side of the object emits a light that penetrates the object (e.g., when it is made from glass), and the light after passing through the object can then be captured by the light sensor.

The embodiments described above shows a convolutional neural network with a specific structure shown in FIG. 3. However, the invention is not limited to such, as other types of neural networks with different layer structures can also be used.

What is claimed is:

1. A method for material classification of an object, comprising the steps of:
   a) measuring, by a first light sensor, an intensity of a first light signal from an object;
   b) measuring, by a second light sensor, an intensity of a second light signal from the object;
   c) obtaining, by a computing device, differential features of intensities of the first light signal between different wavelengths of the first light signal, and differential features of intensities of the second light signal between different wavelengths of the second light signal for input to a neural network implemented by the computing device;
   d) calculating, by the neural network, for each of a plurality of possible classes of material, a probability of the object containing the material of the class;
   e) determining, by the neural network, a material of the object based on one of the plurality of possible classes of material that has a highest probability, wherein the computing device in step c) computes the differential features for the intensities of both said first light signal and said second light signal using the following formula:

$$d_{In} = (I_{n+1} - I_n)/(w_{n+1} - w_n)$$

wherein n is a sampling index from 0 . . . to N−2, N−1; wherein N is the number of samples taken for the intensity of the first light signal or intensity of the second light signal; $I_n$ is the intensity corresponding to the wavelength $w_n$ at n; and
   f) providing an automatic material classification based on the determined material of the object, by the neural network, which achieves a high recognition rate of the material.

2. The method of claim 1, wherein the neural network is a convolutional neural network comprising two consecutive convolution layers.

3. The method of claim 1, wherein both the first light sensor and the second light sensor are near-infrared sensors.

4. The method of claim 3, wherein the first light signal comprises lights having wavelengths within the range of 900 nm-1700 nm; and the second light signal comprises lights having wavelengths within the range of 1750 nm-2150 nm.

5. A system for material classification of an object, comprising:
   a) a first light sensor adapted to measure an intensity of a first light signal from an object;
   b) a second light sensor adapted to measure an intensity of a second light signal from the object;
   c) a computing device connected to the first light sensor and the second light sensor; the computing device adapted to implement a neural network;
   wherein the neural network is configured to receive differential features of intensities of said first light signal at different wavelengths of said first light signal and differential features of the intensities of said second light signal at different wavelengths of said second light signal; the neural network further adapted to calculate, for each of a plurality of possible classes of material, a probability of the object containing the material of the class, and to determine a material of the object based on one of the plurality of possible classes of material that has a highest probability, the neural network further providing an automatic material classification based on the determined material of the object, with a high recognition rate of the material;

wherein the computing device is further adapted to compute the differential features for the intensity of both said first light signal and said second light signal using the following formula:

$$d_{In} = (I_{n+1} - I_n)/(w_{n+1} - w_n)$$

wherein n is a sampling index from 0 ... to N−2, N−1; wherein N is the number of samples taken for the intensity of the first light signal or intensity of the second light signal; $I_n$ is the intensity corresponding to the wavelength $w_n$ at n.

6. The system of claim 5, wherein the first light sensor and the second light sensor each comprises an integrated light source.

7. The system of claim 5, wherein the neural network is a convolutional neural network comprising two consecutive convolution layers.

8. The system of claim 5, wherein both the first light sensor and the second light sensor are near-infrared sensors.

9. The system of claim 8, wherein the first light signal comprises lights having wavelengths within the range of 900 nm-1700 nm; and the second light signal comprises lights having wavelengths within the range of 1750 nm-2150 nm.

10. The system of claim 5, further comprises a sample stage on which the object is placed; the first light sensor and the second light sensor embedded in the sample stage under a top surface thereof.

11. The system of claim 10, wherein the first light sensor and the second light sensor are arranged side by side.

* * * * *